L. V. LEWIS.

RAILWAY SIGNALING.

APPLICATION FILED FEB. 26, 1921.

Reissued Apr. 26, 1921.

15,096.

5 SHEETS—SHEET 1.

INVENTOR:
Lloyd V. Lewis,
BY A. L. Venoill
His ATTORNEY

L. V. LEWIS.

RAILWAY SIGNALING.

APPLICATION FILED FEB. 26, 1921.

Reissued Apr. 26, 1921.

15,096.

5 SHEETS—SHEET 2.

INVENTOR:

Lloyd V. Lewis,

BY A. L. Venaill

His ATTORNEY

L. V. LEWIS.

RAILWAY SIGNALING.

APPLICATION FILED FEB. 26, 1921.

Reissued Apr. 26, 1921. 15,096.

5 SHEETS—SHEET 3.

INVENTOR:
Lloyd V. Lewis,
BY A. R. Venneill
His ATTORNEY

L. V. LEWIS.

RAILWAY SIGNALING.

APPLICATION FILED FEB. 26, 1921.

Reissued Apr. 26, 1921.

15,096.

5 SHEETS—SHEET 4.

INVENTOR:
Lloyd V. Lewis,
BY
A. L. Merrill
His ATTORNEY

L. V. LEWIS.

RAILWAY SIGNALING.

APPLICATION FILED FEB. 26, 1921.

Reissued Apr. 26, 1921.

15,096.

5 SHEETS—SHEET 5.

INVENTOR:
Lloyd V. Lewis,
BY A. L. Vencill
His ATTORNEY

UNITED STATES PATENT OFFICE.

LLOYD V. LEWIS, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY SIGNALING.

15,096. Specification of Reissued Letters Patent. Reissued Apr. 26, 1921.

Original No. 1,365,329, dated January 11, 1921, Serial No. 121,378, filed September 21, 1916. Application for reissue filed February 26, 1921. Serial No. 448,224.

*To all whom it may concern:*

Be it known that I, LLOYD V. LEWIS, a citizen of the United States, residing at Edgewood borough, in the county of Allegheny and State of Pennsylvania, have invented certain new and useful Improvements in Railway Signaling, of which the following is a specification.

My invention relates to railway signaling, and particularly to signaling of the type in which high frequency oscillating currents are employed to control either fixed signals located along the trackway, or signals carried on the railway vehicles, or both.

I will describe certain forms of signaling systems and apparatus embodying my invention, and will then point out the novel features thereof in claims.

Figure 1A:
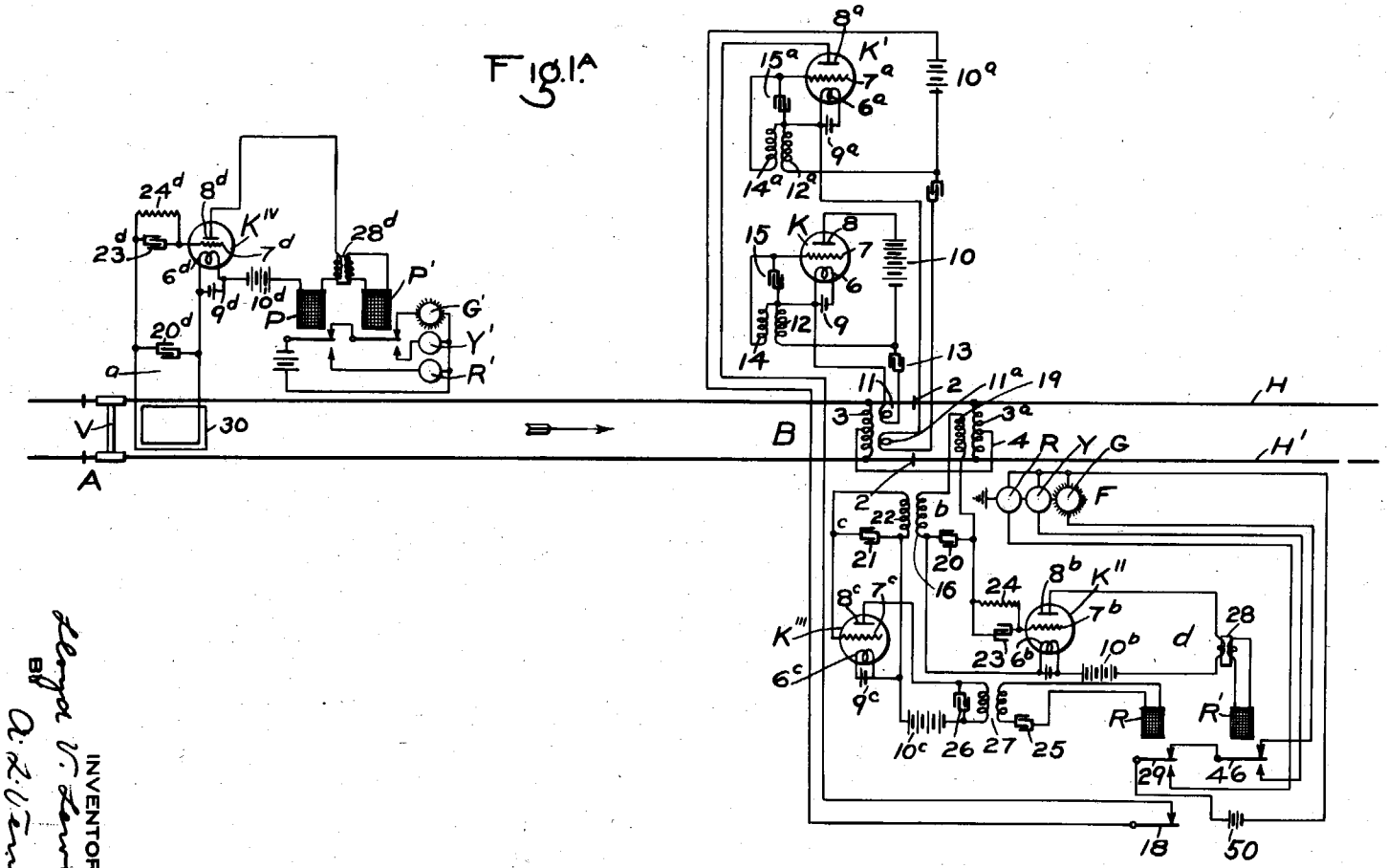
Figure 1B:
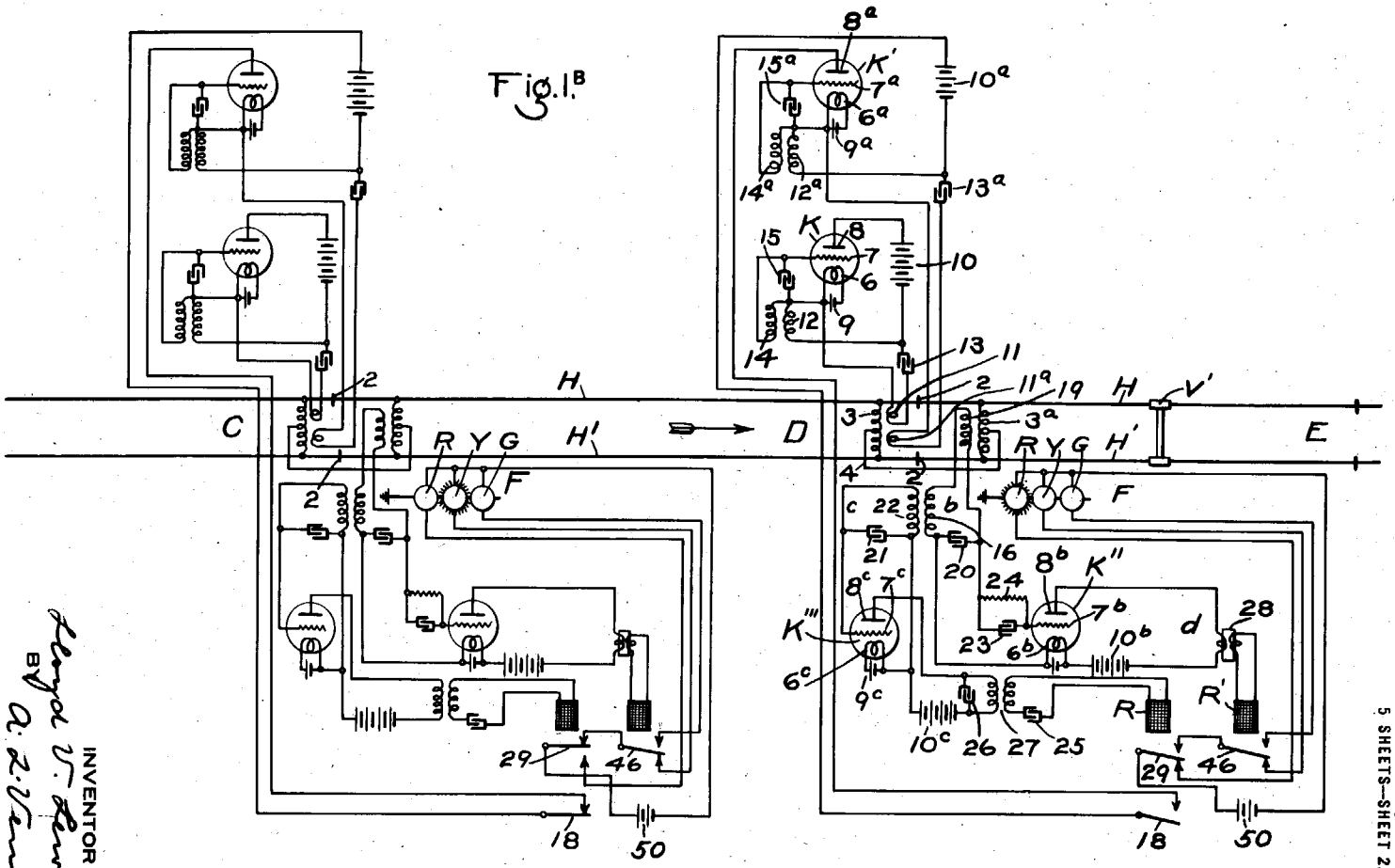
Figure 4:
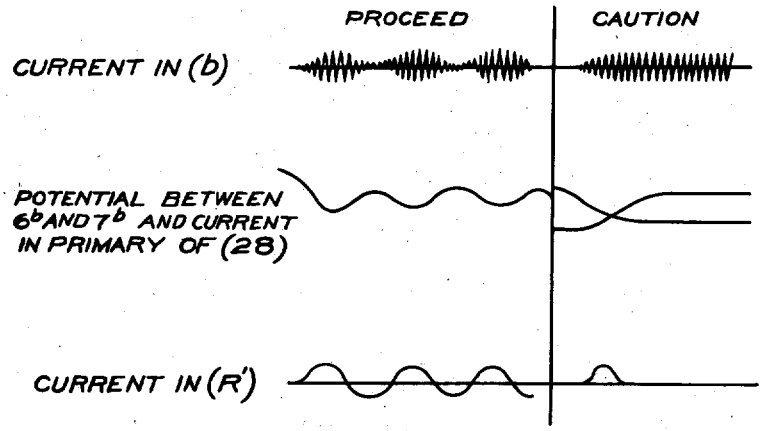
Figure 3:
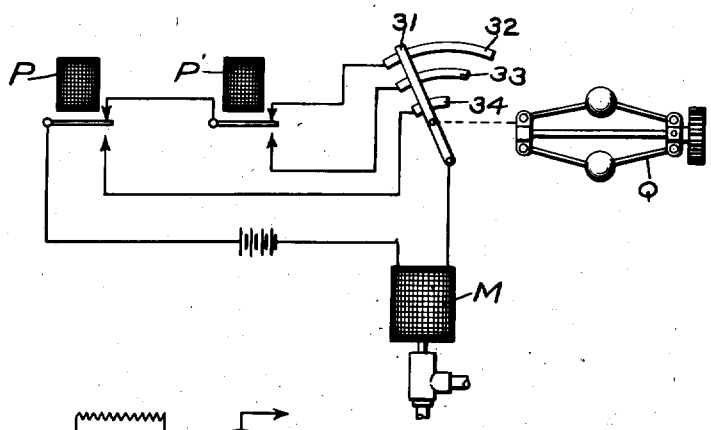
Figure 2:
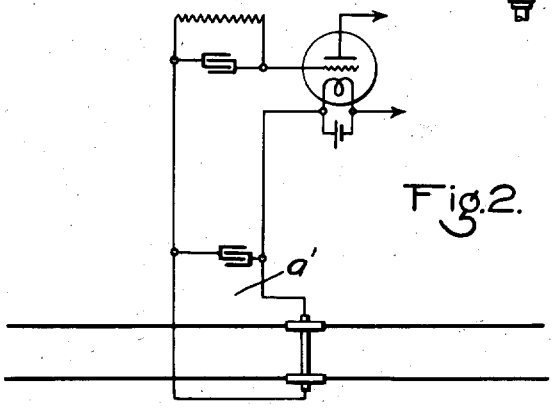
Figure 5:
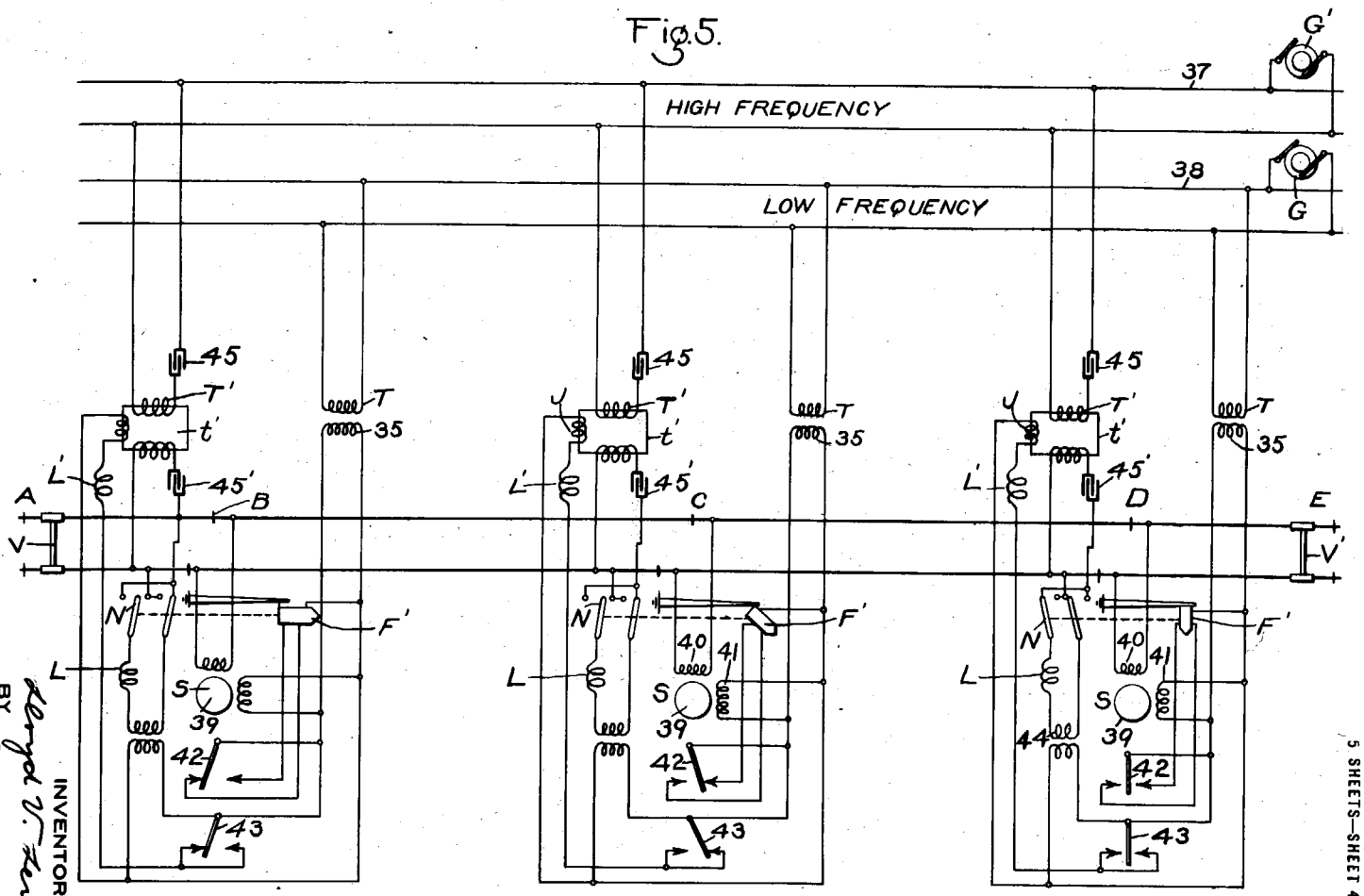
Figure 6:
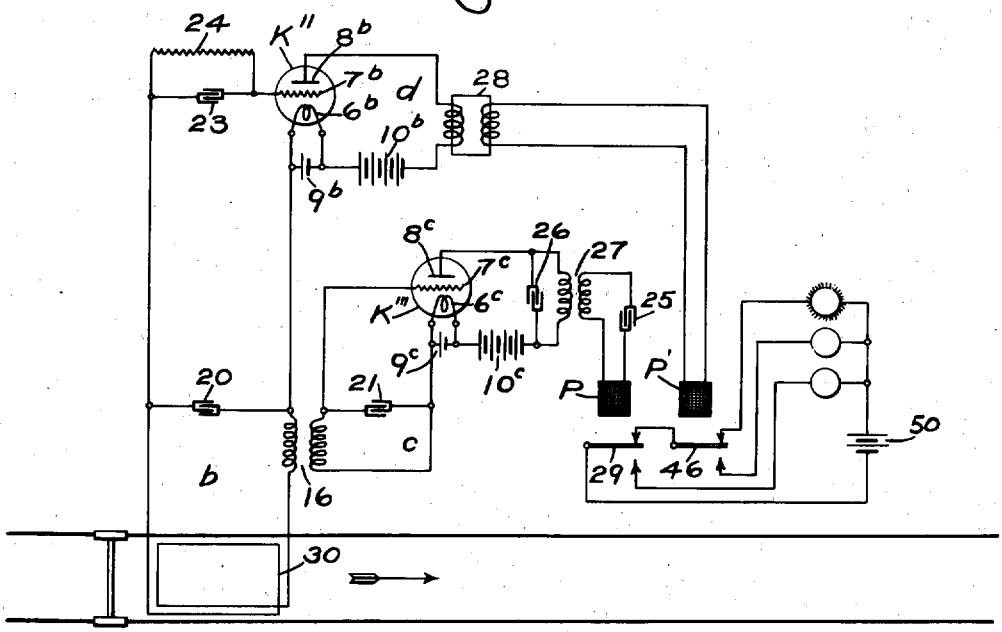

In the accompanying drawings, Figure 1, which is shown in two parts A and B respectively, is a diagrammatic view showing one form of signaling system embodying my invention; Fig. 2 is a diagrammatic view showing a modified arrangement of the vehicle-carried receiving circuit shown in Fig. 1. Fig. 3 is a diagrammatic view showing one form of speed governing apparatus which may be employed in conjunction with the relays shown on the vehicle in Fig. 1. Fig. 4 is a group of diagrams illustrating the current and voltage waves in certain parts of the vehicle-carried apparatus shown in Fig. 1. Fig. 5 is a view showing a modification of the system shown in Fig. 1 and embodying my invention. Fig. 6 is a diagrammatic view showing a modified arrangement of vehicle-carried apparatus of that shown in Fig. 1.

Similar reference characters refer to similar parts in each of the several views.

Referring first to Fig. 1, the reference characters H and H′ designate the track rails of a railway over which traffic normally moves in the direction indicated by the arrow, which rails are divided into block sections A—B, B—C, C—D, etc., by insulated joints 2, 2, etc. As here shown, both rails are divided by such joints, and inductive bonds 3 and 3ª connected at their middle points by conductors 4 are provided to conduct the propulsion current around these joints when the propulsion energy for the cars or trains is electricity. It is immaterial, however, to the present invention how the segregation of the block sections is accomplished, and whether or not the propulsion energy is electricity and if it is whether it is direct or alternating current.

For each block section I provide means for impressing upon the rails thereof alternating signaling currents differing in frequency, which currents are preferably of a high frequency, and which currents differ in frequency preferably by a small value. Consequently when these currents are both supplied to the rails of any one block section there will be in said rails a resultant current of "beat" frequency, that is, a current of periodically varying amplitude, the periodicity depending on the relative frequencies of the two component currents. I then provide signaling means controlled by the current in the track rails and responding to the "beats," that is, to the periodic variations of said current, but not to either of the component currents; and I preferably also provide other signaling means responsive to the component current of higher frequency but not to the beat frequency.

As here shown, the two signaling currents for each block section are generated locally by two similar sets of appartus, one of which is connected at all times to the track rails and comprises a vacuum tube or bulb K containing a filament 6, preferably of tungsten, a metallic plate 8, and a metallic grid 7 located between the filament and the plate. The filament 6 is constantly heated by a battery 9. A second battery 10 is included in a circuit comprising a transformer winding 12, filament 6, and plate 8. Across the terminals of transformer winding 12 is connected a tuned circuit comprising condenser 13 and a winding 11 of a transformer of which the rail bond 3 forms the secondary. Oscillating currents are set up and maintained in this circuit, and so are impressed on the track rails, the frequency of which currents depends on the tuning of a closed resonant circuit comprising transformer secondary 14 and condenser 15. The terminals of condenser 15 are connected respectively to filament 6 and grid 7.

The oscillating difference of potential across condenser 15 is thereby impressed between filament 6 and grid 7 to produce corresponding variations in the current in the circuit of battery 10, resulting in the producton of oscillations in the resonant circuit comprising condenser 13 and winding 11 of bond 3 whereby the oscillations are impressed upon the track rails.

The second set of generating apparatus, comprising bulb K′, battery $10^a$, etc., and which is tuned to a frequency lower than that of the first set, is controlled by a contact 18 of a relay R which relay is in turn controlled by traffic conditions in the section next in advance as hereinafter explained. The result is that the rails of any one block section are always supplied with signaling current of the higher frequency, and are also supplied with current of the lower frequency when the section next in advance is unoccupied and the rails thereof are intact.

Although I have herein shown means for generating the two signaling currents locally for each section, it is understood that any other suitable means may be employed for supplying these currents to the rails.

Located adjacent the entrance end of each block section are two relays R and R′, the former of which is responsive to the signaling current of higher frequency and the latter to the beat frequency but not to either of the component signaling currents alone. These relays are energized as follows: The rail bond $3^a$ constitutes the primary of a transformer of which 19 is the secondary winding, and this secondary is included in a circuit *b* comprising transformer primary 16 and condenser 20, which is tuned broadly to the mean of the two component signaling current frequencies. Connected across the terminals of condenser 20 is a circuit including a condenser 23 shunted by a high resistance 24, and the grid and filament of a vacuum tube device K″, similar to the device K hereinbefore described. Sustained oscillations in the circuit *b* will produce an oscillating difference of potential on condenser 20 which, due to the rectifying action of the tube, will gradually build up a charge on condenser 23 and consequently on the grid $7^b$, resulting in a decrease in the steady value of the current from a battery $10^b$ in the plate circuit of the tube. A decrease in the oscillations in circuit *b* will permit the charge on condenser 23 to leak off through resistance 24, thereby permitting an increase in the current from battery $10^b$. Each group of oscillations in circuit *b*, therefore, produces a single fluctuation of the battery current in circuit *d*; that is, there will be a single fluctuation of the current in circuit *d* for each beat or periodic variation in the amplitude of the signaling currents. Relay R′ is supplied with alternating current of a frequency corresponding to this beat frequency by a transformer 28 the primary of which is included in circuit *d* and the secondary of which is connected with the relay; this relay is designed to respond to current of the frequency which it thus receives, but not to the frequency of either of the component signaling currents. Coupled to transformer coil 16 in circuit *b* is a secondary coil 22 in a circuit *c* tuned by means of condenser 21 to resonance at the frequency of the higher frequency signaling current. Connected across the terminals of condenser 21 is a circuit including the grid $7^c$ and filament $6^c$ of bulb K‴. The plate circuit of bulb K‴ includes filament $6^c$, battery $10^c$ and primary of transformer 27, (which is tuned by means of condenser 26) and plate $8^c$. Sustained oscillations in resonant circuit *c* will produce an oscillating difference of potential between filament $6^c$ and grid $7^c$ which will produce corresponding variations in the current in the circuit of battery $10^c$ which will be reproduced as oscillations in the tuned circuit comprising secondary of transformer 27, condenser 25 and relay R. Relay R, therefore, receives oscillating current corresponding in frequency to the higher frequency component current. This relay is designed to respond to such current.

As hereinbefore pointed out, the supply of the lower frequency signaling current to each section is controlled by a contact 18 of relay R for the section next in advance, which contact is closed only when the section in advance is unoccupied. It will be evident, therefore, that the rails of a section immediately in the rear of an occupied section contain current of the higher signaling frequency only, whereas the rails of the second section in the rear of an occupied section contain signaling current of both frequencies. It follows, therefore, that for the section in the rear of an occupied section relay R is energized and relay R′ deënergized, but for the second section in the rear of the occupied section both relays R and R′ are energized.

In Fig. 1 I have shown fixed or roadside signals F, F, etc., but the provision of such signals is not essential in all cases for the reason that the passage of cars or trains along the railway may be adequately governed by the signals and other apparatus on the cars or trains themselves as hereinafter described and explained. As shown in Fig. 1, one fixed signal F is located adjacent the entrance end of each block section and as here shown each of these signals is of the well known "light" type, comprising three electric lamps G, Y and R, indicating when illuminated "proceed," "caution" and "danger" respectively. These several indications are usually conveyed by green, yellow and red glasses in front of the respective lamps, as is well understood in the art. The three lamps of each signal are controlled by the adjacent relays R and R′ through the medium of circuits supplied with current from a suitagle source, such as a battery 50. These circuits need not be traced in detail, it being sufficient to point out their operations briefly as follows: Lamp G is controlled by the upper contact point 29 of relay R and the upper contact point 46 of relay R′, so that this lamp can be illuminated only when both relays are energized, that is, when the corresponding block section and the section next in advance are unoccupied; lamp Y is controlled by the upper contact point 29 of relay R and the lower contact point 46 of relay R′, so that this lamp is illuminated only when relay R is energized and relay R′ deënergized, that is, when the corresponding block section is unoccupied and the section next in advance is occupied; lamp R is controlled only by the lower contact point 29 of relay R, so that this lamp is illuminated only when this relay is deënergized, that is, when the corresponding section is occupied by a car or train. The conditions of the roadside signal apparatus by virtue of which the signals are caused to indicate "proceed," "caution" and "stop" are shown respectively at locations B, C and D in Fig. 1, the "caution" and "stop" indications at locations C and D being due to the presence of a vehicle V′ in section D—E.

At the left hand end of Fig. 1, part A, I have shown diagrammatically a railway vehicle V (a car, locomotive or train) which is equipped with apparatus adapted to be controlled by the signaling currents in the track rails and which apparatus is arranged to give signal indications by virtue of which the speed and progress of the vehicle are governed. As here shown, the signaling apparatus comprises three lamps G′, Y′ and R′, which lamps are used to give the same indications as those in the roadside signals, that is, "proceed", "caution" and "stop". The signal lamps on the vehicle are controlled by two relays P and P′ in exactly the same manner as the lamps in each roadside signal F are controlled by the corresponding relays R and R′. Mounted on the vehicle V in front of the forward pair of wheels is a coil 30, which is in inductive relation to both of the track rails in advance of the forward axle. This coil is included in a circuit *a* tuned broadly to the mean of the two frequencies of signaling currents in the track rails. The apparatus between the resonant circuit *a* and the relays P and P′ is identical to the apparatus in the trackway between circuit *b* and relay R′, except that relay P is a direct current relay and is connected directly into the circuit of battery $10^d$, and is adjusted to respond to an increase in the current of battery $10^d$ due to the presence of oscillations in resonant circuit *a*. Suffice it to say that relay P is responsive to the signaling current of the high frequency and relay P′ is responsive to the beat frequency.

The operation of the vehicle-carried apparatus will be readily understood from the following brief explanation. Sections A—B and B—C being both unoccupied except for vehicle V both relays P and P′ on this vehicle are energized so that the green lamp G′ is illuminated indicating "proceed". As the vehicle enters section B—C no change will occur because this section and the section C—D in advance are unoccupied. When, however, the vehicle enters section C—D, which is the section in the rear of an occupied section, relay P′ will become deenergized because the signaling current of lower frequency is absent; lamp G′ will therefore become extinguished and lamp Y′ will become illuminated, so that the signal on the vehicle indicates "caution". As the vehicle enters section D—E, which is already occupied, relay P will also become deënergized because of the absence of signaling current in the rails of this section, so that lamp Y′ will become extinguished and lamp R′ will be illuminated, indicating "stop".

In Fig. 2 I have shown an alternative means for transmitting energy from the track rails to the apparatus on the vehicle. In this view, the coil 30 of Fig. 1 is eliminated, and the resonant circuit *a′*, which corresponds to circuit *a*, is connected directly with the journal boxes or wheels of the front axle of the vehicle, the inductance of this axle forming part of the inductance of the circuit. The remainder of the apparatus on the vehicle is the same as the apparatus shown in Fig. 1, and the operation of the modified form shown in Fig. 2 is the same as that of the form shown in Fig. 1.

It is, of course, understood that the relays P and P′ on the vehicle may be employed to give signals of any desired character or to control the vehicle in any desired manner. If it is desirable to govern the speed of the vehicle in accordance with traffic conditions in advance, such control may be accomplished by means such as that shown in Fig. 3, wherein 31 is a contact arm operatively connected with the running gear of the vehicle through the medium of a speed-responsive device Q so that the position of this arm varies with variations in the speed of the vehicle; the higher the speed, the farther this arm swings to the right, and vice versa. This arm coöperates with fixed contact segments 32, 33 and 34 which are included in circuits with the contacts of relays P and P′. A brake application magnet M is controlled by these circuits in the following manner.

When both relays P and P′ are energized, the circuit for magnet M is completed through the upper contact points of these relays and the fixed contact segment 32, which is of such length that the vehicle may proceed at maximum speed before the circuit will be opened by the movement of arm 31 beyond the right hand end of segment 32. When, however, relay P′ becomes deënergized and relay P is energized, this being the "caution" condition of the vehicle-carried apparatus, the circuit for magnet M is completed through upper point of the contact of relay P and the lower contact point of relay P′ and segment 33, which segment is shorter than segment 32, so that the vehicle must proceed at an intermediate speed in order to avoid opening the circuit of magnet M. When both relays P and P′ are deënergized, this being the "stop" condition of the apparatus, the circuit for magnet M is completed through the lower contact point of relay P and the very short segment 34, so that if the vehicle exceeds a very low speed, the circuit for magnet M will be opened and the brakes applied. It is understood that so long as magnet M is energized, the brake pipe remains closed and the brakes are not applied. The three speeds corresponding to segments 32, 33 and 34 may be any desired values, such, for example, as 60, 30 and 10 miles per hour.

Referring to Fig. 4, I have here shown diagrammatically the current wave forms in the various circuits between the trackway and relay R′. Under "proceed" conditions the current in circuit *b* is of periodical varying amplitude because of the two superimposed currents differing in frequency; if these currents are of equal value, the resultant current will pass through zero once for each period as indicated, but, of course, if the two component currents differ in value, the resultant current will not reach zero at any time. The potential between filaments $6^b$ and grid $7^b$ will have substantially the wave form indicated because of the action of the condenser 23 and resistance 24, and the current in the primary winding of transformer 28 will have substantially the same wave form because of the action of the amplifier K″. The current in the secondary of transformer 28 and in relay R′ will have the wave form substantially as shown in the third line of the diagram, because of the action of transformer 28. The wave forms under "caution" conditions will be readily understood, and need not be explained in detail. Since the action of bulb K‴ in energizing relay R is simply a relaying or amplifying action, it is not thought necessary to explain the transformations between resonant circuit *b* and relay R by diagram.

The corresponding circuits on the vehicle have also substantially the same wave forms as shown in Fig. 4.

Referring now to Fig. 5, I have here shown a system involving another means for producing an oscillating signaling current varying periodically in amplitude. G is a generator of low frequency current such for example as 60 cycles per second, to which generator are connected transmission mains 38 extending along the railway. Current is supplied to the track rails of each block section from these mains through transformers T, the primary of each transformer being connected with the mains 38 and the secondary 35 being connected with the track rails of the corresponding section through a transformer 44, a choke coil L, and a pole-changer N operated as hereinafter explained. Located adjacent the entrance end of each section is an induction motor relay S comprising a rotor 39, two stator windings 40 and 41, and two contacts 42 and 43 operatively connected with the rotor. The winding 40 of each relay is connected with the rails of the corresponding section, and winding 41 of each relay is connected with a secondary 35 of the adjacent transformer T. Each relay is responsive, therefore, to swing its contacts 42 and 43 in one direction or the other from the middle position in accordance with the relative direction of current in the track rails as determined by pole-changer N. Each relay S controls a fixed or roadside signal F′, which, as here shown, is of the semaphore type having three indicating positions. Each signal is controlled by contact 42 of the corresponding relay in such manner that when the contact is in the middle position the signal is in the horizontal or "stop" position; when the relay contact swings to the right it closes a local circuit which causes the signal to move to the inclined or "caution" position; and when the relay contact swings to the left it closes another local circuit which causes the signal to move to the vertical or "proceed" position. The pole-changer N for each block section is controlled by the signal for the section in advance in the usual manner. The apparatus thus far referred to is old and well understood, and needs no further explanation.

Superimposed on the track rails is a high frequency current which is used only to control the signals or other apparatus on the cars or trains. As here shown, this high frequency current is furnished by a generator G′ to which are connected transmission mains 37 extending along the railway. The frequency delivered by this generator G′ may be, for example, 20,000 cycles per second. Each block section is supplied with this high frequency current through a transformer T′ having an iron core $t'$ whose primary is connected with the transmission mains 37 through a condenser 45, and whose secondary is connected with the track rails through a condenser 45′. The primary and secondary circuits are preferably tuned to resonance at the frequency delivered by generator G′. Surrounding a portion of the core $t'$ is a coil J which is connected with the secondary 35 of the adjacent transformer T whenever contact 43 of the adjacent track relay is swung either to the right or to the left. The purpose of the coil J is to utilize the low frequency current from the transformer T to saturate intermittently the iron core $t'$ thus causing periodic variation in amplitude of the high frequency current admitted to the track rails. It will therefore be evident that the current in the mains 37 which is of a single frequency is transformed into a current whose amplitude varies periodically, so that the track rails are supplied with current of high frequency which possesses a beat. The high frequency and the periodic variations in amplitude are employed for controlling vehicle-carried signals as in the other forms of my invention.

In order to exclude the high frequency current from the low frequency circuit, I provide a choke coil L′ which is connected in the circuit with impedance coil J and preferably adjacent thereto whereby the passage of the high frequency current into the circuit of the impedance coil will be prevented, as will be understood by those versed in the art. The choke coil L connected in circuit with the secondary of the transformer 44 is for the same purpose as that of the coil L′, the former being adapted to prevent the high frequency current from the secondary of the transformer T′ from entering the secondary of the transformer 44 but at the same time permitting the flow of the low frequency from the transformer 44 into the track rails. Choke coil L further serves to limit the flow of current from transformer 44 when the track rails adjacent the transformer are connected together by the wheels of a vehicle.

In connection with this system, any suitable apparatus may be arranged upon a vehicle for responding to the signaling frequencies in the track rails, such as that shown in Fig. 1. Relay P on the vehicle responds to the high frequency signaling current and relay P′ responds to the periodic variations in amplitude of the high frequency current. It should be here noted that the periodically varying high frequency current comprises two components of constant amplitude, one of which is current of a frequency greater than that produced by generator G′ and the other of which is a current of a frequency less than that of G′, so that if combined, these component currents would produce a beat frequency of the same periodicity as that produced in the high frequency current from generator G′ by means of the variable impedance due to core $t^2$ when the latter is magnetized by low frequency current in coil J.

The operation of the system shown in Fig. 5 so far as the vehicle signals are concerned, will now be readily understood. I will assume that block section A—B is occupied by a vehicle V which is equipped with the same apparatus as vehicle V in Fig. 1[a]. Inasmuch as block sections A—B and B—C are unoccupied except for vehicle V, high frequency current of periodically varying amplitude is present in circuit $a$ on the vehicle, so that both relays P and P′ are energized and the green lamp G′ is illuminated. As the vehicle passes into block section B—C this condition continues because relay S at the entrance of section C—D is energized. Relay S at the entrance of section D—E is, however, deënergized owing to the presence of vehicle V′ in that section so that the high frequency current is constant in amplitude in the rails of section C—D; consequently, when the vehicle V enters this section its relay P′ will become deënergized and the "caution" lamp Y′ will become illuminated. As the vehicle V passes into section D—E relay P will also become deënergized so that the "stop" lamp R′ will be illuminated.

It will be understood that the circuit $a$ on vehicle V may be replaced by a circuit $a'$, as shown in Fig. 2, and it will also be understood that the speed control apparatus shown in Fig. 3 may be provided on vehicle V either in conjunction with or as a substitute for the lamps G′, Y′, and R′ shown in Fig. 1.

In Fig. 6 I have shown a vehicle carried apparatus which is adapted to be used in conjunction with the track systems shown in Fig. 1 or 5, and is similar to the apparatus for controlling the roadside signals F shown in Fig. 1 with the exception that the coil 30 is employed to reproduce the signaling current in the circuit $b$ instead of the primary of the rail bond 3[a] as in Fig. 1. Inasmuch as the two apparatuses are identical in construction with the above exception, it is thought that a detailed description of Fig. 6 is unnecessary. To avoid confusion the reference characters employed in the roadside apparatus of Fig. 1 have been used in Fig. 6 for designating the corresponding parts, as will be understood.

The operation of the vehicle-carried apparatus shown in Fig. 6 is identical with that of the vehicle-carried apparatus shown in Fig. 1, the only difference being, that, instead of employing a single device K[IV] for selecting and amplifying the signaling frequencies, two such devices are used, one for each of the relays P and P′, whereby a more positive selection and greater amplification of the frequencies may be obtained.

Although I have herein shown and described only certain forms of signaling systems and apparatus embodying my invention, it is understood that various changes and modifications may be made therein within the scope of the appended claims without departing from the spirit and scope of my invention.

Having thus described my invention, what I claim is:

1. A railway signaling system comprising track rails, means for impressing thereon an alternating signaling current, means for at times causing the amplitude of said current to vary periodically, a vehicle, and signaling means on the vehicle controlled by the current in the track rails and responsive to the variations in amplitude of said current but not to said current.

2. A railway signaling system comprising track rails, means for impressing thereon two alternating currents differing in frequency, and signaling means responsive to the resulting current of periodically varying amplitude but not to either of the signaling currents alone.

3. A railway signaling system comprising a vehicle, a receiving circuit thereon, means located in the trackway for impressing on said circuit two alternating currents differing in frequency, and signaling means on the vehicle controlled by said circuit and responsive to the resulting current therein of periodically varying amplitude but not to either of the signaling currents alone.

4. A railway signaling system comprising a vehicle, a receiving circuit thereon, means exterior to the vehicle for impressing on said circuit an alternating current of periodically varying amplitude, and signaling means on the vehicle responsive to the periodic variations of said current but not to said current.

5. A railway signaling system comprising a vehicle, a receiving circuit thereon, means exterior to the vehicle for impressing on said circuit a high frequency oscillating current, means for causing the amplitude of said current to vary periodically at times, and signaling means on the vehicle selectively responsive to said high frequency current and to the periodic variations of said current.

6. A railway signaling system comprising track rails, means for impressing on said rails alternating current of periodically varying amplitude, means for detecting the presence of said variations, and a signal controlled by said detecting means.

7. A railway signaling system comprising track rails, means for impressing on said rails alternating current of periodically varying amplitude, means for translating said variations into an alternating current of the same frequency as that of the variations, and signal controlling means responsive to said last-named current.

8. A railway signaling system comprising track rails, means for impressing on said rails alternating current of periodically varying amplitude, and signal-controlling means responsive to the periodic variations of said current but not to said current.

9. A railway signaling system comprising track rails, means for impressing on said rails alternating current of periodically varying amplitude, means for translating said variations into an alternating current of the same frequency as that of the variations, a signal responsive to the first current but not to the second and another signal responsive to the second current but not to the first.

10. A railway signaling system comprising track rails, means for impressing on said rails alternating current of periodically varying amplitude, means responsive to the presence and absence of said alternating current, other means responsive to the presence and absence of said variations in amplitude, and signaling apparatus controlled by said two last-mentioned means.

11. A railway signaling system comprising track rails, a track circuit including said rails and a source of alternating current, a fixed coil in inductive relation to a portion of said track circuit, a relay located in the trackway, a roadside signal controlled by said relay, and an electron amplifier interposed between said coil and said relay.

12. A railway signaling system comprising track rails, a track circuit including said rails and a source of alternating current, a fixed coil in inductive relation to a portion of said track circuit; an electron amplifier located in the trackway and having a heated filament, a plate, and a grid interposed between the two; the terminals of said coil being connected with the filament and grid of said amplifier, a plate circuit for said amplifier comprising a source of direct current and a relay, and a roadside signal controlled by said relay.

13. A railway signaling system comprising track rails, a track circuit comprising said rails and a source of alternating current, a trackway circuit receiving a minute amount of energy from said track circuit, a relay located in the trackway, an electron amplifier interposed between said trackway circuit and said relay, and a roadside signal controlled by said relay.

14. Railway traffic controlling apparatus comprising track rails, means for impressing an alternating signaling current on said rails, means controlled by traffic conditions in advance for causing the amplitude of said current to vary periodically, a vehicle, a device on the vehicle responsive to the variations in the amplitude of said current but not to the current itself, a second device on the vehicle responsive to said current but not to the variations in amplitude thereof, and governing means on the vehicle controlled by said devices.

15. Railway traffic controlling apparatus comprising a trackway circuit, means for constantly supplying alternating signaling current to said circuit, means controlled by traffic conditions in advance of said circuit for causing the amplitude of said current to vary periodically, a vehicle, and governing means on said vehicle controlled by current in said trackway circuit and responsive to the variations in amplitude of said current but not to said current itself.

16. Railway traffic controlling apparatus comprising a trackway circuit, means for constantly supplying alternating signaling current to said circuit, means controlled by traffic conditions in advance of said circuit for causing the amplitude of said current to vary periodically, a vehicle, a device on the vehicle responsive to the variations in amplitude of said current but not to the current itself, a second device on the vehicle responsive to said current but not to the variations in amplitude thereof, and governing means on said vehicle controlled by said devices.

17. Railway traffic controlling apparatus comprising a trackway circuit, means for impressing on said circuit an alternating current of periodically varying amplitude, and traffic governing means responsive to periodic variations in the amplitude of said current but not to said current itself.

18. Railway traffic controlling apparatus comprising a trackway circuit, means for supplying an alternating current to said circuit, other means controlled by traffic conditions in advance of said circuit for supplying to said circuit, a second alternating current differing in frequency from the first thereby causing periodic variations in the amplitude of the first current, a vehicle, and traffic governing means on the vehicle controlled by current in said trackway circuit and responsive to the variations in amplitude of said first current but not to the first current itself.

19. Railway traffic controlling apparatus comprising a trackway circuit, means for supplying an alternating current to said circuit, other means controlled by traffic conditions in advance of said circuit for supplying to said circuit a second alternating current differing in frequency from the first thereby causing periodic variations in the amplitude of the first current, a vehicle, a device on the vehicle responsive to the variations in the amplitude of the first current but not to the first current itself, a second device on the vehicle responsive to said first current but not to the variations in amplitude thereof, and governing means on the vehicle controlled by said devices.

20. Railway traffic controlling apparatus comprising a vehicle, a receiving circuit thereon, means located in the trackway for impressing on said circuit two alternating currents differing in frequency, a device on the vehicle responsive to the resulting current of periodically varying amplitude in said circuit but not to either alternating current alone, a second device on the vehicle responsive to one of said alternating currents in said circuit but not to the resulting current of periodically varying amplitude, and governing means on the vehicle controlled by said devices.

21. In combination, a section of railway track provided with a track circuit, a signal for said section, and an electron tube controlled by said track circuit for governing said signal and comprising a heated filament, a grid and a plate.

22. In combination, a section of railway track provided with a track circuit, a signal and an electron tube for said section, a grid circuit for said electron tube controlled by said track circuit, a plate circuit for said tube including a source of current, and means associated with said plate circuit for controlling said signal.

23. In combination, a section of railway track provided with a track circuit; an electron tube having a heated filament, a grid and a plate; a grid circuit for said tube controlled by said track circuit, a plate circuit for said tube including a source of energy, and a signal for said section controlled by said plate circuit.

24. In combination, a section of railway track provided with a track circuit, a signal for said section, and means interposed between said track circuit and said signal for controlling said signal and including an electron tube having a heated filament, a grid and a plate.

In testimony whereof I affix my signature.

LLOYD V. LEWIS.